United States Patent [19]

Wittke

[11] 4,092,670
[45] May 30, 1978

[54] VIDEO PROCESSOR FOR SOLID STATE STAR TRACKER

[75] Inventor: Ernest Carl Wittke, Baldwin, N.Y.

[73] Assignee: The Singer Company, Little Falls, N.J.

[21] Appl. No.: 748,989

[22] Filed: Dec. 9, 1976

[51] Int. Cl.² .............................................. H04N 7/18
[52] U.S. Cl. .................................................... 358/125
[58] Field of Search .............................. 358/125, 126; 250/203 CT

[56] References Cited

U.S. PATENT DOCUMENTS

| | | | |
|---|---|---|---|
| 3,562,423 | 2/1971 | Murphy | 358/126 |
| 3,769,456 | 10/1973 | Woolfson | 358/126 |
| 3,903,357 | 9/1975 | Woolfson | 358/126 |
| 3,950,611 | 4/1976 | Callis | 358/126 |
| 3,953,670 | 4/1976 | Prince | 358/125 |

Primary Examiner—Howard W. Britton
Attorney, Agent, or Firm—Thomas W. Kennedy

[57] ABSTRACT

In a solid state star tracker of the type in which an array of image detectors is viewed and scanned with the video signals therefrom processed to determine star location, both horizontal and vertical location are determined using a crossover detector after the vertical information has been rotated or twisted to become horizontal information which can thereby be processed in the same manner as the horizontal information.

33 Claims, 25 Drawing Figures

INITIAL SIGNAL
AFTER VERTICAL FILTER
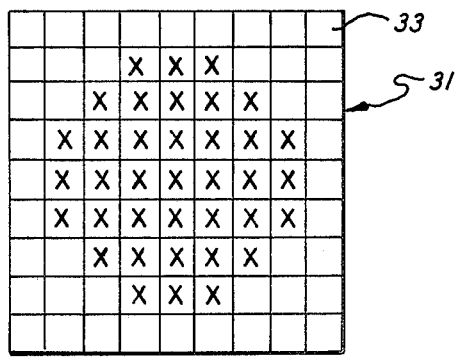
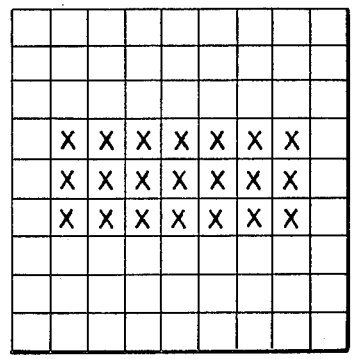
FIG. 3a
FIG. 3b
AFTER HORIZONTAL FILTER
WITH NEGATIVE CANCEL
WITHOUT NEGATIVE CANCEL
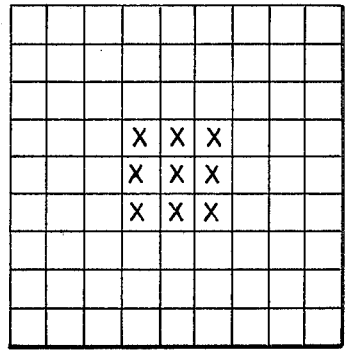
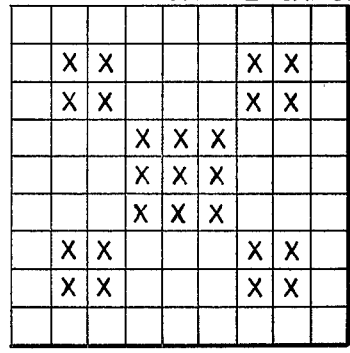
FIG. 3c
FIG. 3d
POSSIBLE HORIZONTAL FILTER OUTPUT
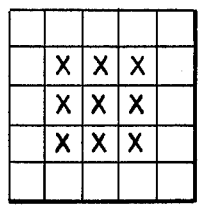 OR 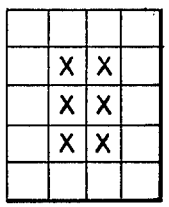 OR 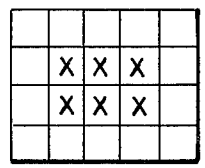 OR 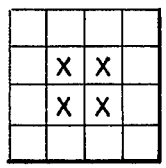
FIG. 3e    FIG. 3f    FIG. 3g    FIG. 3h
(DEPENDS ON STAR POSITION)

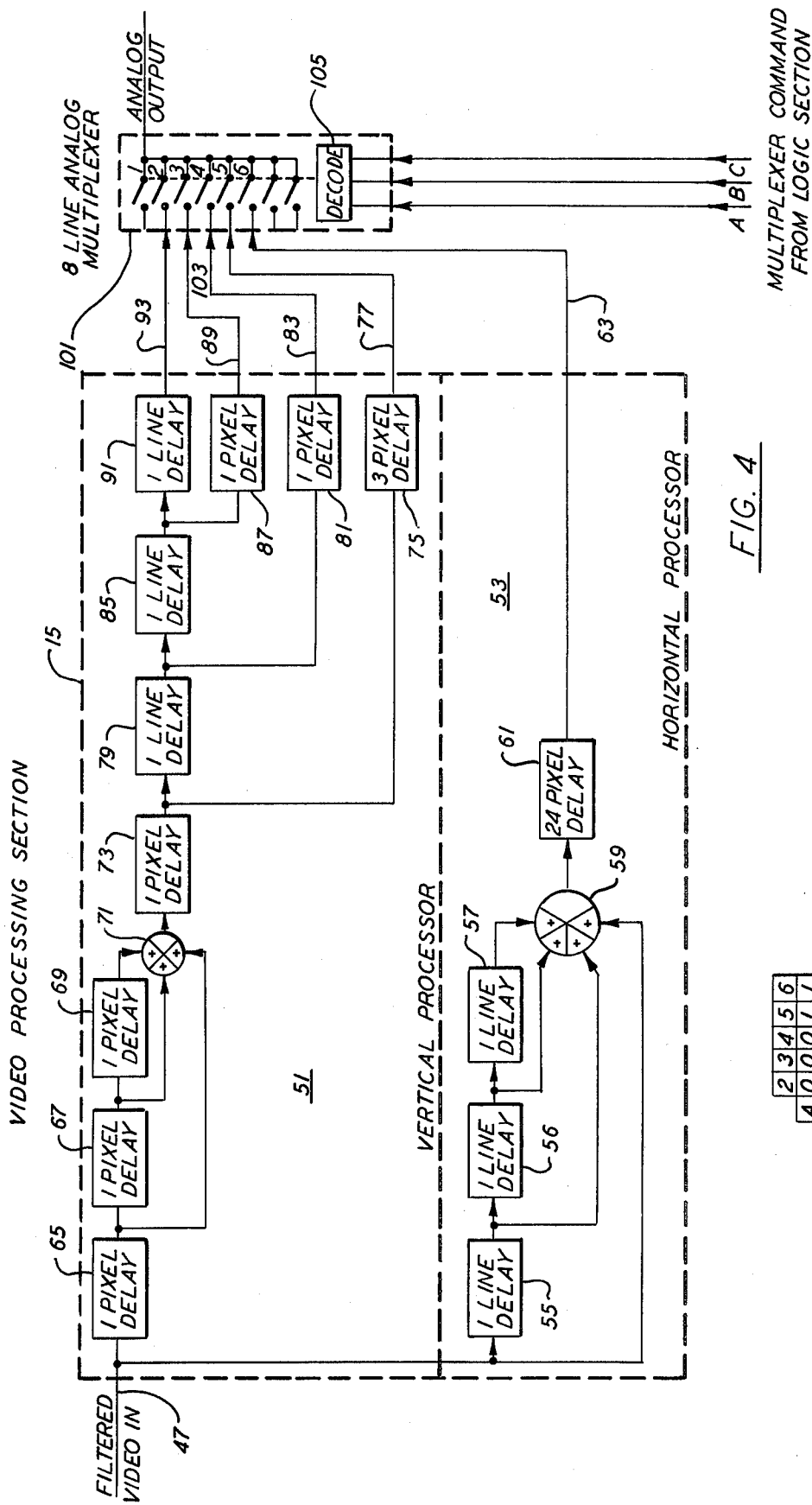

VERTICAL PROCESSING – ANALOG DATA

DATA

| A | D | G |
|---|---|---|
| B | E | H |
| C | F | I |

94 — FIG. 5a

DATA AFTER HORIZONTAL AVERAGING

|   |   | 96 |   |   |   |
|---|---|----|---|---|---|
|   | A | A+D | A+D+G | D+G | G |
|   | B | B+E | B+E+H | E+H | H |
|   | C | C+F | C+F+I | F+I | I |

95 — FIG. 5b

DATA AFTER DELAY LINE SHIFTING

FIRST READ → ↓   3 LINE DELAY

READ I →
READ II →

|   |   | 96 |   |   |   |
|---|---|----|---|---|---|
| A | A+D | A+D+G | D+G | G |
| B | A+E | A+E+H | E+H | H |
| C | A+F | A+F+I | F+I | I |

FIG. 5c

READ → ↓   2 LINE + 1 PIXEL DELAY

READ I →
READ II →

|   |   |   | 96 |   |   |
|---|---|---|----|---|---|
|   | A | A+D | A+D+G | D+G | G |
|   | B | B+E | B+E+H | E+H | H |
|   | C | C+F | C+F+I | F+I | I |

FIG. 5d

READ → ↓   1 LINE + 2 PIXEL DELAY

READ I →
READ II →

|   |   |   |   | 96 |   |   |
|---|---|---|---|----|---|---|
|   |   | A | A+D | A+D+G | D+G | G |
|   |   | B | B+E | B+E+H | E+H | H |
|   |   | C | C+F | C+F+I | F+I | I |

FIG. 5e

READ → ↓ 96   3 PIXEL DELAY

READ I →
READ II →

|   |   |   |   | A | A+D | A+D+G | D+G | G |
|---|---|---|---|---|---|---|---|---|
|   |   |   |   | B | B+E | B+E+H | E+H | H |
|   |   |   |   | C | C+F | C+F+I | F+I | I |

READ DONE ON ROW I OR ROW II     FIG. 5f

FIG. 5g READ I

FIG. 5h READ II

VERTICAL OUTPUT = COLUMN NO. OF CENTROID (INTERPOLATED)
+ (ROW NO. - COLUMN NO) OF FIRST 'READ' SIGNAL

HORIZONTAL PROCESSING - ANALOG DATA

HORIZONTAL OUTPUT = COLUMN NO. OF CENTROID (INTERPOLATED)

VIDEO PROCESSOR FOR SOLID STATE STAR TRACKER

The government has rights in this invention pursuant to contract No. N0030-76-C-0088 awarded by the Department of the Navy.

This invention relates to solid state star trackers in general and more particularly to an improved arrangement of locating the vertical star position in such a device.

Solid state star trackers are presently used in navigational systems. Typically they may be used in aircraft or space craft flying above the earth. In such devices it is common practice to utilize a scanned solid state array of detectors. The video output signal is passed through a band pass filter to remove suprious low frequency [large objects] data and high frequency [noise] signals. The resulting star signal pulse is sensed by a level crossing detector, the timing of which is used as a measure of horizontal position. Unless peak amplitude sensing is employed, vertical position can only be determined by averaging the line numbers on which a target occurs. With this prior art method and external computer is required to determine vertical and horizontal star position. Interpolation between lines is not feasibly without the addition of a peak sampling detector and amplitude digitizer which requires additional computer processing.

Thus, the presently used system, if good accuracy is to be obtained is quite costly and complex. In view of this the need for an improved processor for a solid state star tracker becomes evident.

The present invention provides a solution to this problem. It is based on the recognition of the fact that horizontal data is readily interpolated by the low pass filter and internal digital processing circuitry of the known system. Making use of this knowledge, the present invention in its broadest form comprises twisting the vertical data into the horizontal axis and then processing that vertical data using the same circuitry as is used to process horizontal data.

In order to implement the processing system of the present invention, three additional elements above those used in the prior art processing system are required. The first of these comprises a two axis filter which in effect is a spatial filter tuned to point images which acts to take the star image, detect it and compress it to a smaller image still centered about the same point. The next element is a video processing section. The video processing section makes use of a number of delays to both average the signal [for both the horizontal signal and vertical signal] and to process the vertical signal through delays to in effect carry out the twisting from vertical to horizontal. The processor operates in combination with the third element of the improved system which is a logic station which has as its purpose detecting the presence of good data and at that time coupling the appropriate outputs of the video processor at the proper times to the digitizer portion or digital output section which, using the conventional techniques of the prior art, detects the star position, both vertical and horizontally using a crossover detector. The only additional to this prior art circuit is means to properly enable the digitizer to sequentially digitize and store the vertical and then the horizontal information.

The approach of the present invention permits complete filtering, detection and position interpolation of the star signal produced by a solid state sensor within the star tracker itself without relying on an external computer. The system has high noise tolerance and interpolation of peak errors of only approximately 5%.

FIGS. 3a–h are matrix diagrams illustrating the manner in which the signal is process through the filters of FIGS. 2a and b.

Figure 1:
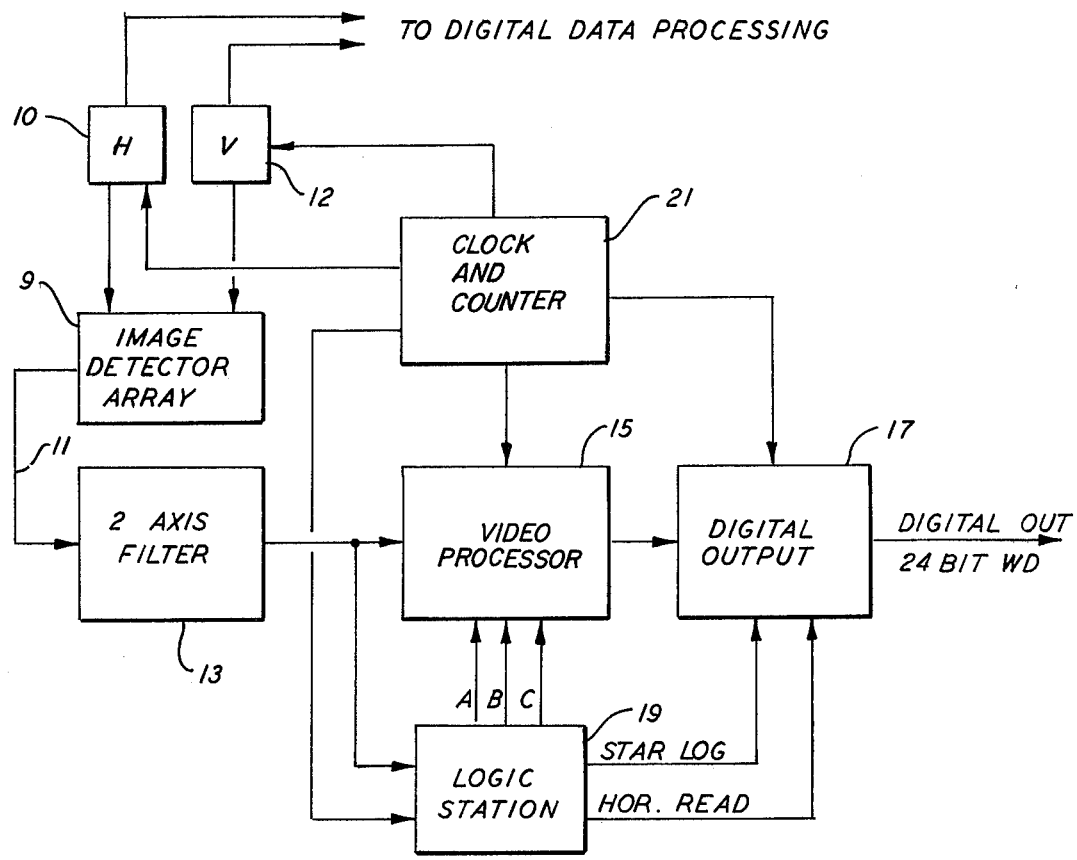
FIG. 1 is an overall block diagram of the system of the present invention.

FIG. 4 is a block diagram of the video processor of FIG. 1.

FIG. 4a is a truth table for the multiplexer shown on FIG. 4.

FIGS. 5a–k are matrix diagrams illustrating the manner in which the video processor of FIG. 4 operates to twist the data.

Figure 6:
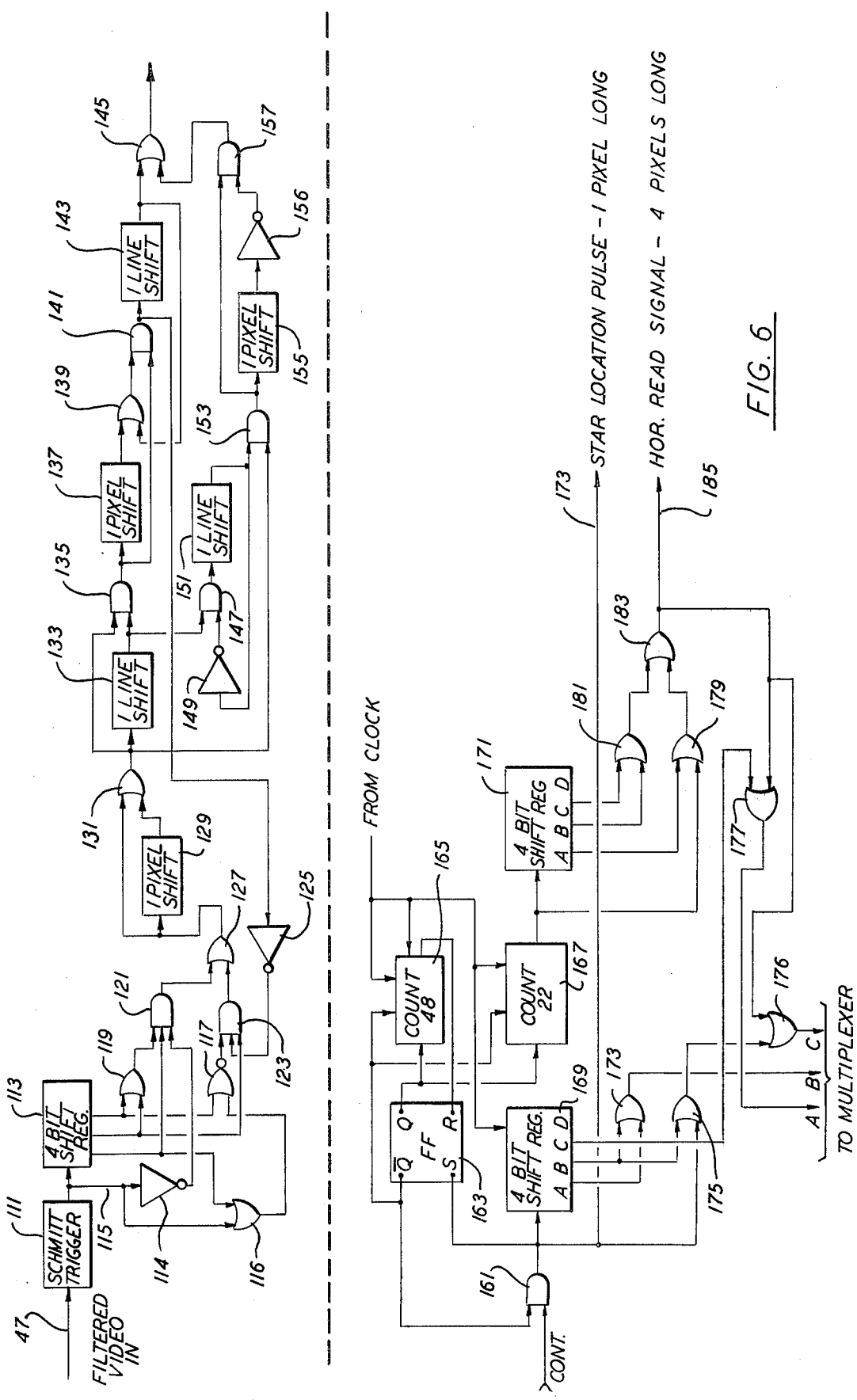

FIG. 6 is a block-logic diagram of the logic portion of the present invention which controls the video processor output and the digitizing process.

Figure 7:
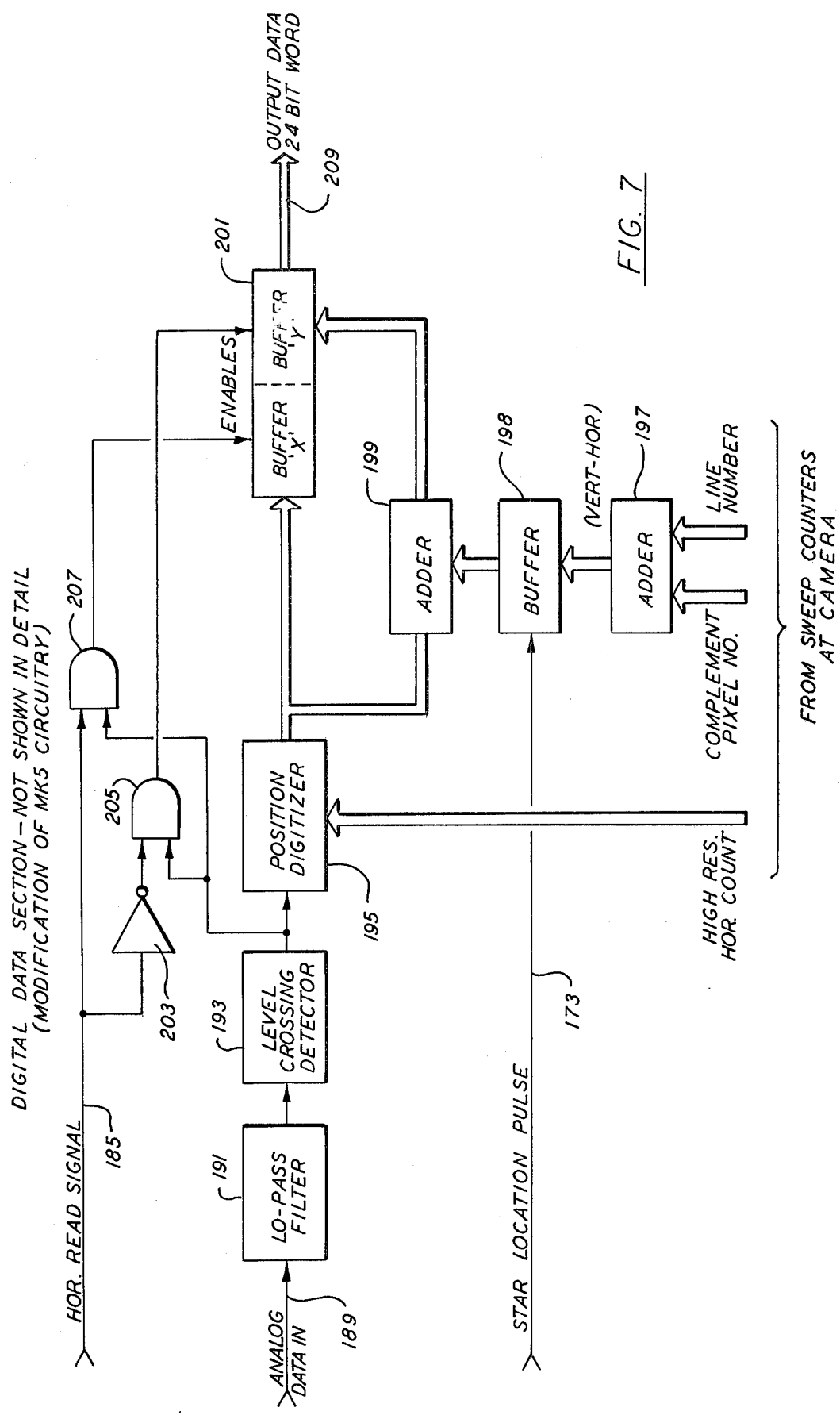

FIG. 7 is a block-logic diagram of the digitizer portion of the system of the present invention.

FIG. 1 is an overall block diagram of the system of the present invention. In conventional fashion, a solid state array 9 of image detectors is scanned horizontally and vertically by digital sweep signals from a horizontal sweep generator 10 and a vertical sweep generator 12. Video input data from the detector 9 on line 11 is provided to a two axis filter 13. The information from the filter passes through a video processor 15 to a digital output module 17 from which the digital output indicating star position is provided. The video processor is controlled by a logic station 19. A conventional clock and counters unit 21 to generate the necessary timing signals is also provided.

Figure 2:
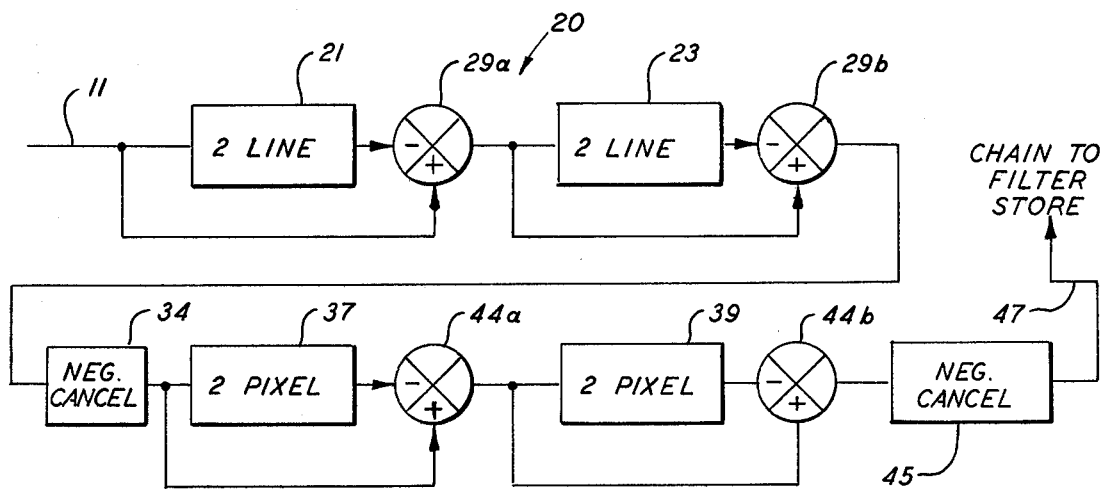
FIG. 2 is a block diagram of a first embodiment the two axis filter of FIG. 1.

FIG. 2 is a block diagram of an embodiment the two axis low pass delay line filter of FIG. 1. This device takes advantage of the fact that the signal output from the solid state imaging device is time sampled at the horizontal rate. This permits the data to be processed through analog/digital delay lines [bucket brigades] without loss of information. The raw video input is passed through a first two line delay line 21. The output of delay line 21 and the raw video signal are inputs to a first summing junction 29a, the output of which is an input to a second delay line 23. The delay period of each is, as indicated, two horizontal lines. The input and output of delay line 23 are inputs to a second summing junction 29b. The output of summing junction 29b is high pass filtered video data [12db/octave] in the vertical axis with a corner frequency at two lines. The effect of this filtering is illustrated on FIGS. 3a and b. Shown on FIG. 3a is a representation of the original signal as it falls on a matrix 31 of individual detectors 33. After filtering, in the vertical filter 20, the signal will appear as shown on FIG. 3b. In other words, the star image shown on FIG. 3a is reduced to an image with two or three horizontal lines by this filtering.

The output signal of the vertical filter 20 is coupled through a negative cancel circuit 34 which prevents splash of data due to the action of the second filter on negative sidelobes formed in the first section. In its simplest form this can be a diode. It is coupled into a horizontal filter constructed in the manner quite similar to the vertical filter. It includes two two pixel delay lines 37 and 39 connected in similar fashion to summing junctions 44a and 44b with the output of summing junction 44b the final filtered output. The effect of this filtering is illustrated by FIG. 3c. This reduces the output in the horizontal direction so that now there is a 3 by 3 matrix of video data at most. The output of the filter 35 is coupled through an additional negative cancel circuit 45 to provide on line 47 the final filtered video output which is coupled to the video processor. FIG. 3d illustrated what would occur without the negative cancelling. As illustrated, positive side lobes would appear in the output of the filter. It should be noted that the time quantitized operations of the sensor and the delay line acts as a high pass filter with a break frequency at the pixel rate. Effectively, therefore, the two axis filter behaves as a two axis spatial filter which is tuned to point images. It rejects signals which result from line-like or area-like images. FIGS. 3e–h illustrate the possible outputs from the horizontal filter on line 47 of FIG. 2. As indicated it is possible to get a 3 by 3, 2 by 3, 3 by 2 or 2 by 2 output arrangement of the data.

FIG. 4 illustrates the video processor 15 of FIG. 1. The video processor consists of two parts, a vertical processor 51 and a horizontal processor 53. Since the horizontal processor is the simpler of the two it will be described first. The filtered input on line 47 is coupled through three delay lines 55, 56 and 57 each having a delay of one line. At a summing junction 59 the filtered input on line 47 and the outputs of all the delay lines are added together. The signal so produce will be the average of the signal existing at the particular horizontal count on the present line and on the three preceding lines. The resulting average signal out of the summing junction 59 is coupled through a delay line 61 having a 24 pixel delay to provide the final horizontal output on line 63. This delay is sufficient to prevent interference between vertical and horizontal signals in the position digitalization process which follows and which will be described below.

The vertical video processing is more complex. The video signal input on line 47 is coupled through three delay lines 65, 67 and 69 each having a one pixel delay. The outputs of the three delays are summed in a summing junction 71. This provides a signal which is the average of the signal on three adjacent pixels on one line. The resulting average signal is divided into four channels which undergo different delays. The output of the summing junction 7 is coupled through a one pixel delay line 73 the output of which is then coupled through a three pixel delay line 75 to provide a first output on line 77. The output of delay line 73 is coupled through a one line delay line 79 the output of which is then coupled through a two pixel delay 81 to provide the second output on line 83. The output of delay line 79 is coupled through additional one line delay line 85 the output of which is coupled through a one pixel delay line 87 to provide the third output signal on line 89. Finally, the output of a delay line 85 is coupled through a further one line delay line 91 to provide the fourth output on line 93. Thus, the output on line 93 will have a three line delay the output on line 89 a delay of 2 lines plus one pixel, the output on line 83 a delay of 2 lines plus two pixels and the output on line 77 a 3 pixel delay. The result of these staggered delays is to convert the data from a vertical column to a horizontal, plus spurious side bands.

FIGS. 5a and b illustrates the effect of averaging the data 94. FIG. 5c–f illustrates the effect of passing vertical rows of averaged data 95 through such a set of offset delays i.e., FIGS. 5c–f illustrates respectively the data after delay line shifting in other words they indicate respectively the output on lines 93, 89, 83 and 77 of FIG. 4.

Next to each is an indication "Read I" and "Read II". The results of sequentially reading the data indicated as "Read I" or "Read II", at the times indicated by the arrows above the columns 96, is shown on FIG. 5g and h. The vertical row 96 is duplicated as a horizontal row 97a and 97b. The vertical data now also appears as a horizontal data sequence. Data read at the horizontal rate on this line is a duplication of the original vertical data. Horizontal data on the other lines i.e., other than "Read I or Read II" is erroneous and must be rejected. It is necessary, therefore, to make a prior selection of the line on which data is to be read. In order to correctly obtain vertical data it is necessary that the data be twisted from only one vertical column. Twisting of data from more than one column will produce erroneous results. This selection can only be made by also making a prior decision of which column to sense since the vertical data appears in more than one column, and averaging the column, since the circuit thus far described produces data in more than one column.

Since the selection of row and column about which the twist operation is to take place must be made independently of the data in the delay line, the reading of the staggered delay line data is most effectively done by using a multiplexer which, on the selected reading rows sequentially selects data from the outputs on lines 93, 89, 83, and 87. The effect is to produce horizontal data which is identical with the original vertical data without spurious side bands as required to carry out the twisting of the present invention. Thus, as illustrated on FIG. 4, these four outputs, along with the output on line 63, i.e., the horizontal data are provided to an analog multiplexer 101. In the illustrated embodiment an eight line multiplexer is provided although only five of the lines are required. The individual switches 103 therein are closed in response to outputs from a decoding module 105 which is addressed by three digital bits which are supplied by the logic station 19 of FIG. 1 in a manner tube described below. The multiplexer is a commercially available unit and has the truth table indicated on FIG. 4a.

Figures 5I, 5J, 5K:
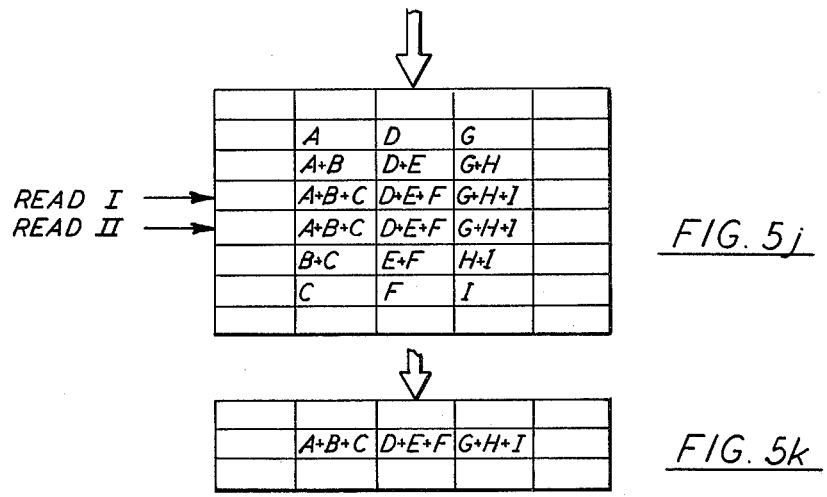

The results of the horizontal averaging and sampling through the multiplexer 101 are shown on FIGS. 5i–k. FIG. 5i shows the initial data, FIG. 5j the data after averaging and FIG. 5k the sampled data.

The logic section which provides the necessary inputs to the decoder 105 of the multiplexer is illustrated on FIG. 6. The video signal from the filter on line 47 is sensed by Schmitt Trigger 111. If the output of the Schmitt trigger on line 115 in input to a four bit shift register 113 and an inverter 114. It is also coupled as one input to an OR gate 116. The second input to the OR gate 116 is from the first output of the fourbit shift register. The output of gate 116 is one input to an additional OR gate 117 having as a second input the third output of the fourbit shift register. A further OR gate 119 has as inputs the second and third outputs of the shift register 113. The output of OR gate 119 is one input to AND gate 121 having as its other inputs the first output of the shift register and the output of OR gate 117, the second output of the shift register and the output of an inverter 125 which obtains its input further on in the system below. The output of gates 121 and 123 are inputs to an OR gate 127. The nature of this system is such that, if the Schmitt trigger senses a pixel sequence of 0, 1, X, 1 or 0, 1, 1 or 0, 0, 10 and there is a 0 input to the inverter 125, the output of the gate 127 is a "1". Otherwise it is a "0". The X in the sequence above means that it does not matter.

An output from gate 127 indicate a good horizontal candidate to read. This output from gate 127 is coupled through a one pixel delay line 129 and is then ORED with itself in a OR gate 131. This in effect provides two horizontal columns as candidates for a star position read. The output of gate 131 is coupled into a one line delay 133 the output of which is ANDED in AND gate 135 with the output of gate 131. The output of gate 135 is coupled through a one pixel delay 137 the output of which is one input to an OR gate 139. The output of OR gate 139 is an input to an AND gate 141 having as its second input the output of AND gate 135. It is the output of this AND gate 141 which is fed back to the inverter 125. This output is also coupled into a one line shift or delay 143 the output of which is one input to an OR gate 145. The output of the delay line 133 is also one input to another AND gate 147 having its second input from an inverter 149. The output of AND gate 147 is coupled through a one line delay line 151, the output of which is one input to AND gate 153. It is also fed back as the input to the inverter 149. The second input to AND gate 153 is from the output of OR gate 131. The output of AND gate 153 is coupled through a one pixel delay line 155 and an inverter 156 to AND gate 157. The second input of the AND gate 157 is the output of AND gate 153. The output of AND gate 157 is the second input to OR gate 145. The portion of the circuit just described processes the data from the OR gate 131, which as noted above gives candidates for a star position read. Coincidence between horizontal pattern senses on either succeeding scan lines or scan lines separated by one scan line will result in an output signal determining the column number to read. Two horizontal pattern sense signals in a group of three lines produces a line read signal. The output of the OR gate 145 is an input to AND gate 161 having as its second input the $\overline{Q}$ output of a flip flop 163. The flip flop 163 is reset by the output of a counter 165 having a 48 pixel count. The flip flop is set by the output of AND gate 161. The $\overline{Q}$ output of a flip flop 163 is used to reset the counter 165. The Q output is used to enable the counter. These same outputs are also enabling and reset inputs to a 22 pixel counter 167. The purpose of the flip flop 163 and counter 165 is to block operations for 48 pixel times to allow the low pass filter to settle before another star detection. After this occurs and the flip flop 163 is reset, gate 161 is enabled. Upon the occurrence of a read signal from the OR gate 145 the output of the AND gate will be present and will be supplied to a fourbit shift register 169, also at the same time setting the flip flop 163. This enables the counter 165 and counter 167. The counter 167 which counts 22 pixel times has its output coupled as an input to a fourbit shift register 171. The output of the AND gate provides on line 173 a star location pulse, one pixel in length. The first output of the fourbit shift register 169 is one input to an OR gate 173. The second output is a second input to OR gate 173 and an input to an input to OR gate 175 having as its second input the output of AND gate 161. The output of OR gate 173 is the B signal to the multiplexer of FIG. 4. The output of OR gate 175 is coupled through OR gate 176 to provide C signal for the multiplexer of FIG. 4. The third output of the shift register 169 is an input to an OR gate 177 the output of which provides the A signal or the multiplexer. The output of the counter 167 is an input to an OR gate 179. The OR gate 179 obtains its second input from the first output of shift register 171. The second and third outputs of shift register 171 are inputs to an OR gate 181. The outputs of OR gates 179 and 181 are inputs to an OR gate 183, the output of which is a second input to an OR gate 177 and also a signal on line 185 indicating a horizontal read signal. This signal is present for a period of four pixels.

Referring to FIGS. 4 and 4a, it will be noted that once the read signal is generated by OR gate 145, assuming there has been sufficient settling time, the C signal to the multiplexer will appear because of the input of AND gate 161 or OR gate 171. This will cause the switch 2 of the multiplexer to be closed coupling the line 93 to the analog output. With the next clock pulse, this bit will now appear at the A output of the shift register 169 and the B signal will appear at gate 173. This will close the switch 3 of the multiplexer to couple the line 89 to the final output. After the next shift, both gates 173 and 175 will have inputs and both signals B and C will be present this will close the switch 4 coupling the output on line 83 to the final output. After the next shift, there will be an input at gate 177 whose output is the A signal. This will cause the switch 5 of the multiplexer to be closed to output the signal on line 77. After the 22 pixel delay, the output from gate 183 appears for four pixel times and is coupled through gates 177 and 176 to provide the A and C outputs to multiplexer 101 to couple the horizontal signal out. As noted, the same signal on line 185, provides a horizontal read signal which is synchronized with the delayed horizontal video data, (e.g. delayed indelay line 61 of FIG. 4).

FIG. 7 illustrates in block diagram form the digital data processing section. This is basically a modification of prior art apparatus which was previous used simply for the processing horizontal data but which is now modified so as to also process the vertical data which has been twisted. The input to the system is on a line 189 and is the analog output of the multiplexer 101. As illustrated above in connection with FIG. 5, while data appears on three vertical delay lines and three delays for horizontal averaging of the vertical data permits one row uncertainty to be tolerated in both horizontal and vertical. It should be noted that the same vertical data appears at the output of the multiplexer regardless of the read row or column and increasing the row number of one decreases the column number by 1. The twisted horizontal data from the multiplexer on line 189 is fed into a low pass filter 191, after which the resulting pulse is fed to a level crossing detector 193. The level crossing detector senses when the pulse exceeds a predetermined threshold value. The output of the level crossing detector which will be a pulse is supplied to a position digitizer 195 obtaining its data input from a high resolution horizontal counter in the horizontal sweep generator 10 of FIG. 1. The mean count of the counter at the time when the level crossing detector is fired provides the horizontal position of the twisted vertical pulse to whatever resolution is required. In order to convert the data to true vertical data, a quantity equal to line number of the read minus the row number of the read is added to the data effectively substituting the vertical line number for the horizontal column number in the digital output. This is accomplished using an adder 197 which adds the line number from the vertical sweep generator 12 of FIG. 1 and complemented pixel number i.e., the complement of the horizontal counter the output of which is then supplied to a buffer 198. Data is supplied to the adder 197 at all times and the buffer 198 samples that data at the time of the star location pulse on line 173. This quantity is then added to the output of the position digitizer 195 in an adder 199 and the output provided to a buffer 201. The output of the position digitizer 195 is also provided directly to the output buffer 201 which, as indicated, has a section for X e.g. horizontal, and Y e.g. vertical, position. To determine which of the buffers is enable, the horizontal read signal on line 185 is coupled through an inverter 203 whose output is one input to AND gate 205 having its second input from the output of the logic crossing detector 193. The horizontal read signal is also an input to an AND gate 207 also having its second input from the level crossing detector 193. The output of AND gate 205 enables the buffer Y of the output buffer 201 and the output of the AND gate 207 enables the output buffer X section. Therefore when the horizontal read signal is present, upon the detection of a level crossing, the AND gate 207 will be enabled to enable the data to be stored in the output buffer X section or horizontal section. If the horizontal read signal is not present, indicating that vertical data is being read, then upon the level crossing detection, the AND gate 205 is enabled enabling the Y portion of the output buffer 201. The output data in the form of a 24 bid word is then available on line 209 and will indicate the horizontal and vertical position of the detected star.

What is claimed is:

1. In a solid state star tracker in which a solid state array of detectors is viewed by a television camera and the video information therefrom processed utilizing a crossover detector to determine the horizontal position of the star, a method of processing the video data so that the vertical position can also be determined by the same crossover detector comprising twisting one or more rows of vertical information so as to cause those rows to become horizontal information and processing the twisted row of information to determine vertical position.

2. The method according to claim 1 wherein said twisting comprises generating first, second, third, and fourth signals from the video signal, the second signal being delayed with respect to the first signal by one line less one pixel, the third signal being delayed with respect to the second signal also by one line less one pixel, and the fourth signal being delayed with respect to the third signal by one line less one pixel and sequentially, over a time of four pixels providing as vertical output signal to be processed to determine vertical location a signal made up of said four signals sampled in sequence each being sampled over a time of one pixel.

3. The method according to claim 2 and further including the step of detecting the optimum point to read data and providing output data for processing at that time.

4. The method according to claim 3 and further including the step of filtering the raw video data prior to processing said data.

5. The method according to claim 4 wherein said filtering comprises a step of horizontal filtering and a step of vertical filtering.

6. Method according to claim 5 wherein said vertical filtering comprises generating a first filtered signal which is made up of the raw video input delayed by two lines minus one half the raw video, minus one half the raw video delayed by four lines.

7. The method according to claim 6 wherein said horizontal filtering comprises processing said first filtered signal to obtain a second filtered signal which is made up of the first filtered signal delayed by two pixel minus one half the first filtered signal minus one half the first filtered signal delayed by four pixels.

8. The method according to claim 7 and further including the steps of cancelling any negative portions of said first and second filtered signals.

9. The method according to claim 8 and further comprising the step of delaying the video input signal to supply a separate horizontal output signal which occurs at a different time than said vertical output signal thereby permitting both signals to be examined sequentially.

10. The method according to claim 9 and further including the step of averaging said video input signal over four lines to obtain an averaged horizontal output signal prior to delay.

11. The method according to claim 10 and further including the step of averaging the input video signal over three pixels to generating said four signals.

12. In a solid state star tracker in which a solid state array of detectors is viewed by a television camera and the video information therefrom processed utilizing a crossover detector to determine the horizontal position of the star, apparatus for determining vertical position with the same crossover detector comprising means for twisting one or more rows of vertical information to cause those rows to become horizontal information and means to permit said crossover detector to process the twisted rows of information to determine vertical position.

13. Apparatus according to claim 12 wherein said means for twisting comprise means for generating first, second, third and fourth signals from the video signal such that the second signal is delayed with respect to the first signal by one line less one pixel, the third signal is delayed with respect to the second signal also by one line less one pixel, and the fourth signal is delayed with respect to the third signal by line one less one pixel and means for sequentially, over a time of four pixels, providing as a vertical output signal to be processed to determine vertical location a signal made up of said four signals sampled in sequence each being sampled over a time of one pixel.

14. Apparatus according to claim 12 and further including means for detecting the optimum point to read data coupled to said means for providing to cause said means for providing to supply vertical output data for processing at that time.

15. Apparatus according to claim 13 and further including means for filtering the raw video data prior to processing said data.

16. Apparatus according to claim 14 wherein said means for filtering comprises a horizontal filter and a vertical filter.

17. Apparatus according to claim 15 wherein said vertical filter comprises means for generating a first filtered signal which is made up of the raw video input delayed by two lines differenced with the raw video, with the difference then delayed by two lines and difference with itself.

18. Apparatus according to claim 17 wherein said horizontal filter comprises means for processing said first filtered signal to obtain a second filtered signal which is made up of first filtered signal delayed by two pixel differenced with said first filtered signal, said difference then delayed and differenced with itself.

19. Apparatus according to claim 16 and further including means for cancelling any negative portions of said first and second filtered signals.

20. Apparatus according to claim 13 and further including means delaying the video input signal to supply a separate horizontal output signal which occurs at a different time than said vertical output signal thereby permitting both signals to be examined sequentially.

21. Apparatus according to claim 20 and further including means for averaging said video input signal over four lines to obtain an averaged horizontal output signal prior to delay.

22. Apparatus according to claim 20 and further including means for averaging the input video signal over three pixels prior to generating said four signals.

23. In a solid state star tracker in which horizontal position information in a video signal obtained from scanning an array of image detectors is processed in apparatus comprising a crossover detector, a digitizer having an input from a high resolution horizontal counter and means to store the digitizer output upon an output from the crossover detector, an improved arrangement which also permits using the crossover detector and digitizer to process vertical position information comprising:
(a) a video processor having means for twisting vertical video data into horizontal data;
(b) a logic station for detecting good data and providing an output to said video processor causing it to output sequentially twisted vertical and horizontal data to the crossover detector; and
(c) means associated with the digitizer and storage means to cause it to sequentially digitize the twisted vertical and horizontal data.

24. Apparatus according to claim 23 and further including a two axis filter for filtering the video input to said video processor.

25. Apparatus according to claim 23 wherein said filter comprises:
(a) a first two line delay line having its input coupled to the raw video signal input;
(b) first means to difference the input and output of said first delay line;
(c) a second two line delay line having the output of said first means to difference as an input;
(d) second means to difference the input and output of said second delay line, the output of said second means forming a first filtered signal;
(e) a third, two line pixel delay line having its input coupled to the first filtered signal;
(f) a third means to difference the input and output of said third delay line;
(g) a fourth, two pixel, delay line having the output of said third means to difference and an input; and
(h) fourth means to difference the input and output of said third delay line.

26. Apparatus according to claim 23 wherein said video processor comprises:
(a) a horizontal processor for averaging and delaying the video input signal; and
(b) a vertical processor for averaging and twisting the video input signal to convert vertical information into horizontal information.

27. Apparatus according to claim 23 wherein said horizontal processor comprises:
(a) a first one line delay coupled to the video input;
(b) a second one line delay in series therewith;
(c) a third one line delay in series with said first and second one line delays;
(d) means to sum the video input and the outputs of said first, second and third one line delays; and
(e) means to delay the output of said summing means by a predetermined number pixels to provide a final horizontal output.

28. Apparatus according to claim 26 wherein said vertical processor comprises:
(a) first, second and third one pixel delay lines in series, the first of said delay lines coupled to the video input signal;
(b) means to sum the outputs of said first, second and third delay lines;
(c) a fourth one pixel delay line having as an input the output of said summing means;
(d) fourth, fifth and sixth one line delay lines in series with said fourth one pixel delay line the output of said sixth one line delay line providing a first signal;
(e) a fifth one pixel delay line having its input coupled to the output of said fifth one line delay line and providing at its output a second vertical signal;
(f) a two pixel delay line having as its input coupled to the output of said fourth one line delay line and providing at its output a third vertical signal; and
(g) a three pixel delay line having as its input the output of said fourth one pixel delay line and providing as its output a fourth vertical signal.

29. Apparatus according to claim 23 and further including a multiplexer having at least five switches which can be individually switched in response to a binary signal at its input, said switches coupled respectively to said delayed horizontal output signal from said horizontal processor and said first, second, third and fourth video signals.

30. Apparatus according to claim 23 wherein said logic station means comprise means to detect a good signal and means to provide outputs in response thereto to successively close said five switches, said four switches coupled to said first, second and fourth video signals being closed in order for one pixel of time over a period of four pixels and said fifth video switch coupled to said delayed horizontal output being closed at time period thereafter.

31. Apparatus according to claim 30 wherein said logic station further includes means to provide outputs to said digitizer and storage means indicating a horizontal read signal, during the time when said fifth switch is closed and indicating a star location at the time when operation of said multiplexer is commenced.

32. Apparatus according to claim 23 wherein said means associated with said digitizer and storage means comprise:
a. storage means having a first section for storing horizontal position data and a second section for storing vertical position data;
b. means responsive to said horizontal read signal to enable said horizontal section of said storage means and in the absence thereof to enable said vertical storage means, the position digitizer having outputs coupled to both said horizontal and vertical sections of said storage means;
c. means to add to said digitizer output an amount indicative of line number minus pixel number to convert the horizontal count digited by said position digitizer into a vertical count;

d. an adder having as an input line number and the complemented pixel number for adding said quantities; and e. a buffer having as an input the output of said adder and having a sampling input coupled to said star location signal, said buffer sampling the output of said adder when said signal appears, the output of said buffer being the input to said adder.

33. Apparatus according to claim 25 and further including a negative cancel circuit interposed between said second means to difference and said third delay line and a second negative cancel circuit having its input coupled to the output of said fourth means to difference and providing at its output the output of said filter.

* * * * *